(12) United States Patent
Zimmerman

(10) Patent No.: US 6,435,048 B1
(45) Date of Patent: Aug. 20, 2002

(54) MULTI-LEG TELESCOPIC LINEAR ACTUATOR

(75) Inventor: Dean A. Zimmerman, Comstock Park, MI (US)

(73) Assignee: Suspa Incorporated, Grand Rapids, MI (US)

( * ) Notice: Subject to any disclaimer, the term of this patent is extended or adjusted under 35 U.S.C. 154(b) by 28 days.

(21) Appl. No.: 09/776,022

(22) Filed: Feb. 2, 2001

(51) Int. Cl.[7] ............................. F16H 25/20; A47B 9/00; B66F 3/10
(52) U.S. Cl. .................. 74/89.35; 108/147; 248/188.4; 254/102
(58) Field of Search ................... 74/89.35; 108/147; 248/188.4; 254/102

(56) References Cited

U.S. PATENT DOCUMENTS

| | | |
|---|---|---|
| 4,062,156 A | 12/1977 | Roth |
| 4,337,868 A | 7/1982 | Gattu |
| 4,396,126 A * | 8/1983 | Moravec et al. ............ 212/230 |
| 4,444,540 A | 4/1984 | Blatt et al. |
| 4,614,128 A | 9/1986 | Fickler |
| 4,651,581 A | 3/1987 | Svensson |
| 4,682,930 A * | 7/1987 | Hachisu ....................... 212/204 |
| 4,793,197 A | 12/1988 | Petrovsky |
| 4,867,000 A | 9/1989 | Lentz |
| 5,111,709 A * | 5/1992 | Torii et al. .................. 74/89.35 |
| 5,128,688 A | 7/1992 | West |
| 5,249,474 A | 10/1993 | Gregory |
| 5,319,990 A | 6/1994 | Veale et al. |
| 5,733,096 A | 3/1998 | Van Doren et al. |
| 5,937,699 A * | 8/1999 | Garrec ........................ 74/89.35 |
| 6,026,970 A | 2/2000 | Sturm, Jr. et al. |
| 6,352,005 B1 * | 3/2002 | Lin et al. .................... 74/89.29 |

* cited by examiner

Primary Examiner—Allan D. Herrmann
(74) Attorney, Agent, or Firm—Price, Heneveld, Cooper, DeWitt & Litton

(57) ABSTRACT

A compact telescopic leg assembly includes a generally cylindrical drive motor mounted axially within the inner leg and coupled to a drive collar by a pedestal mount. A drive screw is threadably coupled to a first drive collar which is attached to the inner leg to raise and lower as the drive screw is rotated by the motor. The pedestal mount couples the motor through the first drive collar to a second drive collar which is coupled to an intermediate leg telescopically receiving the inner leg. Gears couple the motor-driven drive screw to a rotatable power nut coupled to the second drive collar. A fixed drive screw extends from the base within an outer leg upwardly through the second drive collar and cooperates with the power nut within the second drive collar to simultaneously extend and retract the legs as the motor rotates the motor-driven drive screw.

31 Claims, 4 Drawing Sheets

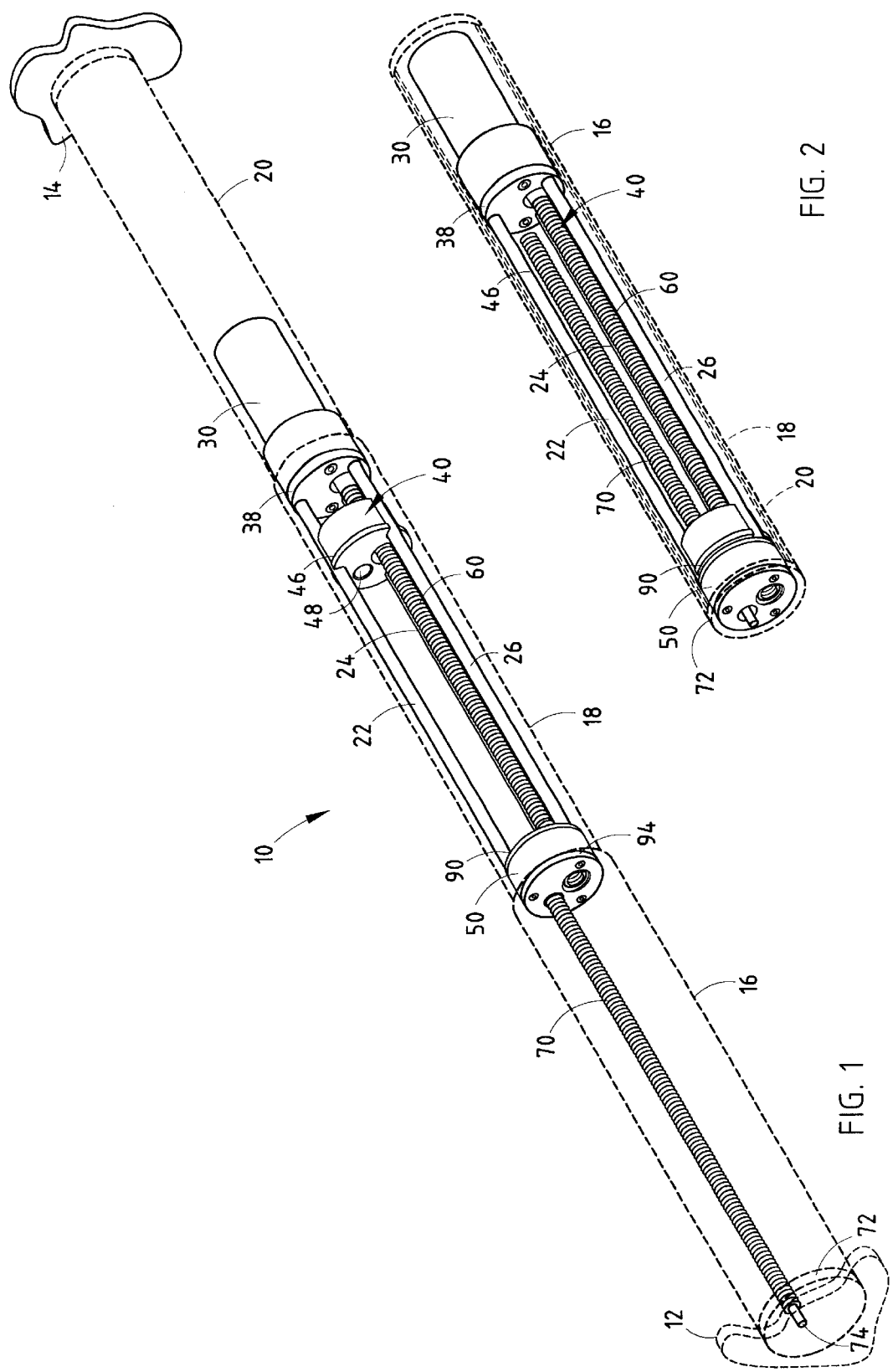

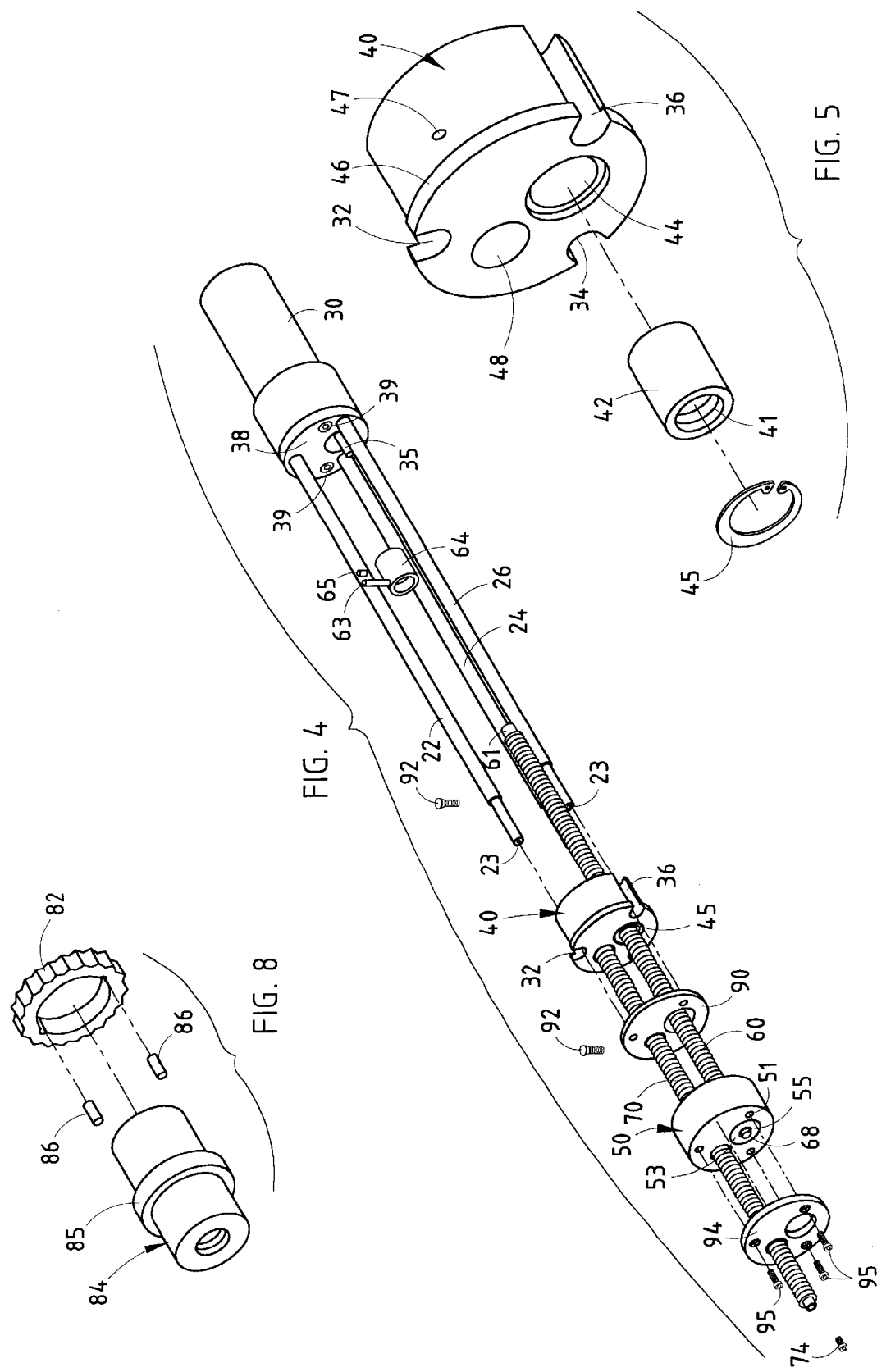

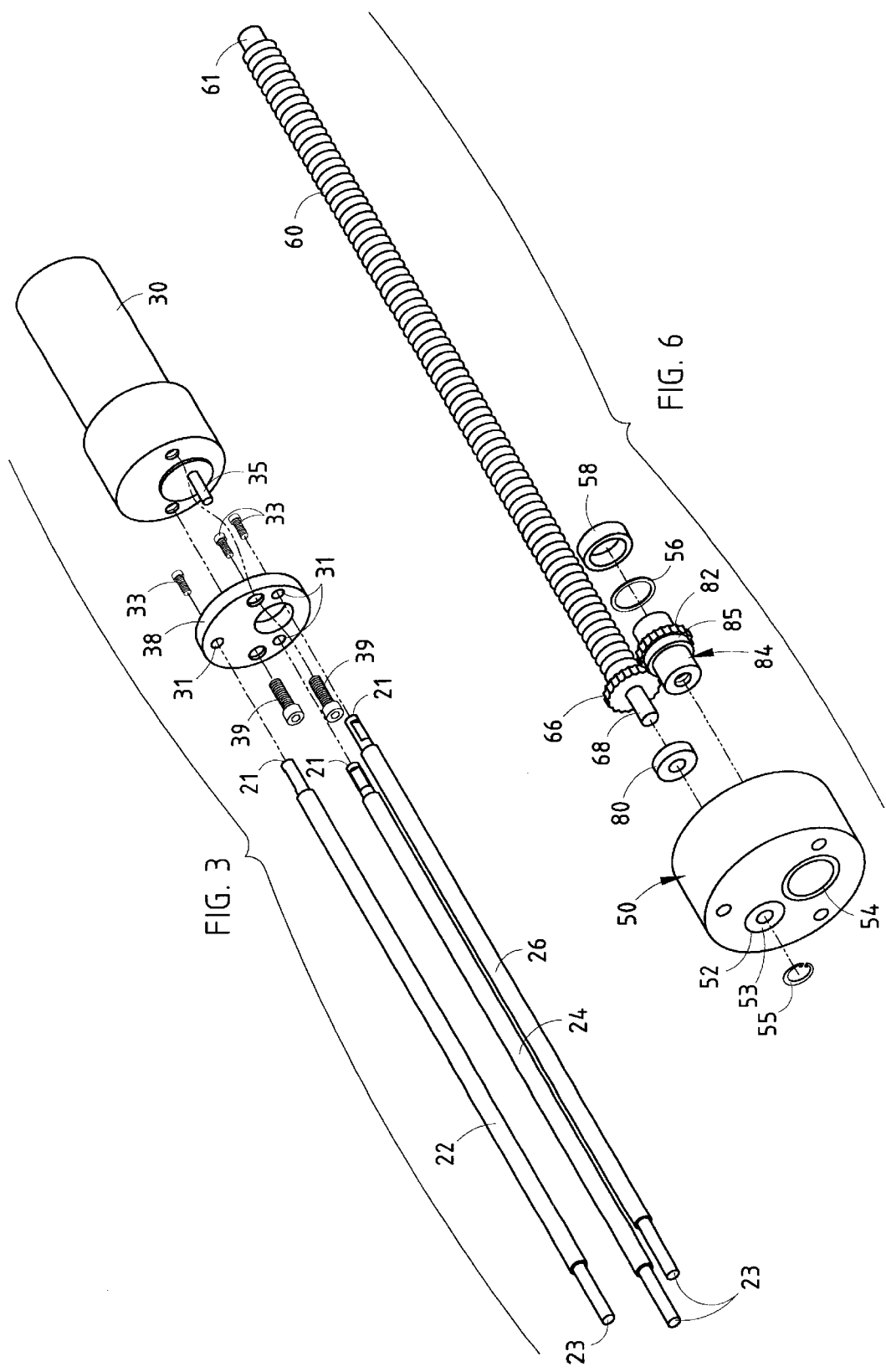

US 6,435,048 B1

MULTI-LEG TELESCOPIC LINEAR ACTUATOR

BACKGROUND OF THE INVENTION

The present invention relates to a motor-driven, telescopic leg and particularly to a compact assembly allowing the mounting of a drive motor within the leg.

In recent years, power-driven adjustable work surfaces, such as tables, work benches and the like, have become increasingly popular in work areas in which it is sometimes desirable to be in a seated position and at other times desirable to be in a standing position, such that table height adjustment is desirable. Utilization of power-driven telescopic legs has facilitated the adjustment of such work surfaces, and typically a pancake-type or other motor drive with a right angle connection to a jack drive screw has been employed. With such a system, the motor is external to the telescopic table leg and is typically mounted to the undersurface of the table. A right angle drive couples to a drive screw, which engages a drive nut, for controlling the telescopic motion of the table leg. Although such a system works adequately, the mounting of a motor to the undersurface of the table is somewhat bulky and unsightly. It is, therefore, desirable to provide a more aesthetically acceptable construction without the need for a motor pod mounted to the undersurface of the tables at each of the leg locations. Attempts have been made to provide a motor drive within the telescopic leg of a table, however, the drive motor occupies significant space and cannot easily be incorporated within the telescopic leg of a table in view of the space constraints.

There exists, therefore, a need for a telescopic motor-driven leg assembly in which the motor can be incorporated within the leg structure and yet provide sufficient torque for lifting a significant work surface at a reasonable speed to accommodate modern conveniently adjustable work surfaces.

SUMMARY OF THE INVENTION

The system of the present invention provides a motor-driven telescopic leg assembly providing sufficient excursion to move a table top or work surface between a lowered position and a raised position. The telescopic leg assembly includes a generally cylindrical drive motor mounted within an inner leg and is coupled in spaced relationship to a drive collar by a pedestal mount. A drive screw couples the motor to a first drive collar which is attached to the inner leg to raise and lower as the drive screw, which is threadably coupled to the first drive collar by a drive nut, is rotated by the motor. A pedestal mount extends through the first drive collar and to a second drive collar which is coupled to an intermediate leg telescopically receiving the inner leg. Gears couple the motor-driven drive screw to a rotatable power nut coupled to the second drive collar. A fixed drive screw extends from the base within an outer leg upwardly in fixed relationship through the second drive collar and receives the gear driven drive nut within the intermediate leg to raise and lower as the motor rotates the motor-driven drive screw.

By providing a pedestal mounted motor in axial alignment within the three telescopic legs at one end, the inner leg diameter can accommodate a motor of sufficient size and power to provide the desired drive forces for adjusting work surfaces providing both the excursion and drive speed necessary.

These and other features, objects and advantages of the present invention will become apparent upon reading the following description thereof together with reference to the accompanying drawings.

BRIEF DESCRIPTION OF THE DRAWINGS

FIG. 1 is a perspective view, partly in phantom form, of a telescopic leg assembly embodying the present invention, shown in a fully extended position;

FIG. 2 is a perspective view, partly in phantom form, of the assembly shown in FIG. 1, shown in a fully retracted position;

FIG. 3 is an exploded perspective view of the motor and pedestal mounting subassembly, shown in FIGS. 1 and 2;

FIG. 4 is a exploded perspective view of the motor mount pedestal and first and second drive collars;

FIG. 5 is an exploded perspective view of the first drive collar, shown in FIGS. 1, 2, and 4;

FIG. 6 is an exploded perspective view of the second drive collar and the gear drive mechanism coupling the second drive collar to the motor-driven drive screw;

FIG. 8 is an exploded perspective view of the gear drive and power nut for the second drive collar.

DETAILED DESCRIPTION OF THE PREFERRED EMBODIMENT

Figure 7:
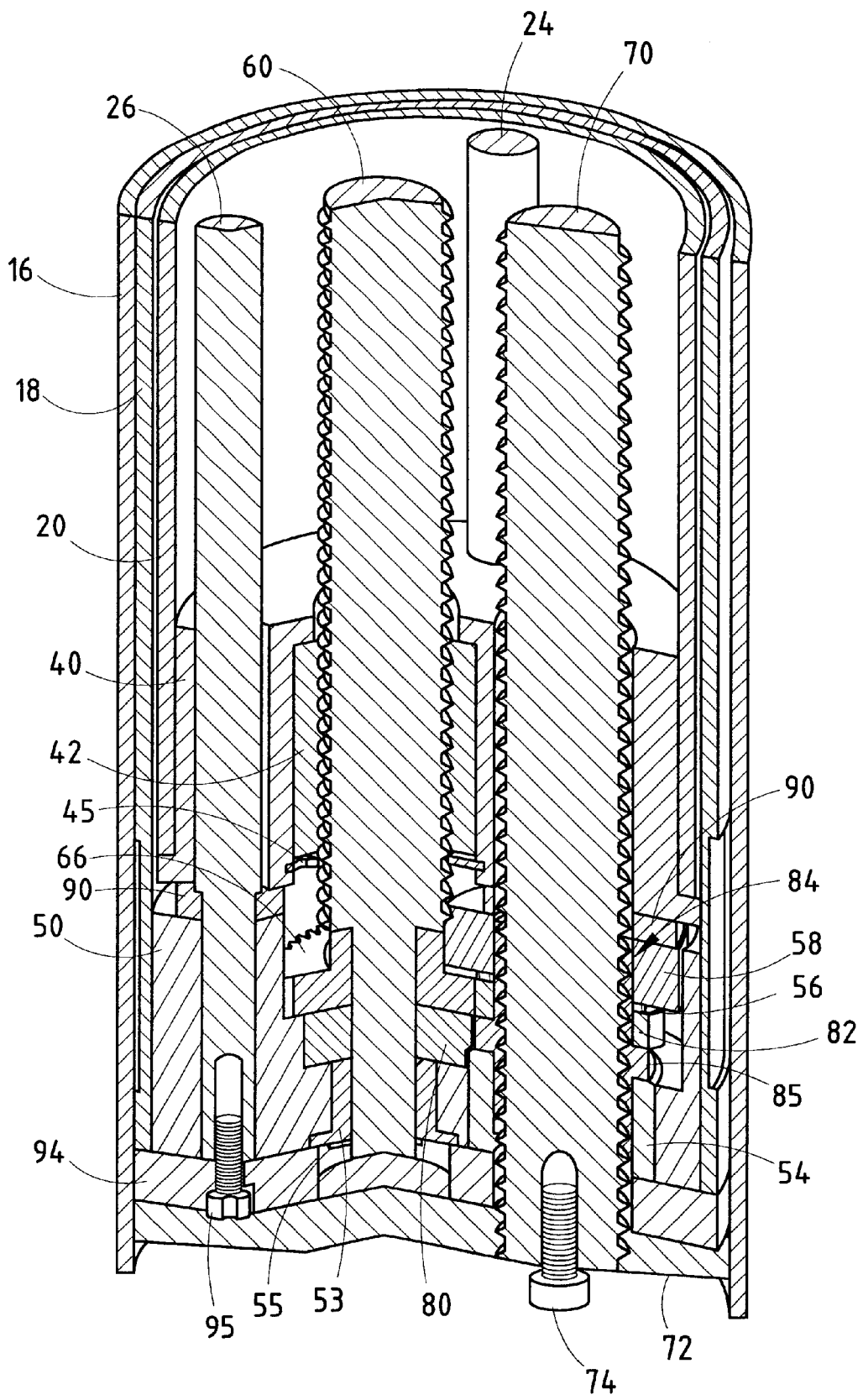
FIG. 7 is an enlarged fragmentary vertical cross-sectional view of the drive collars.

Referring initially to FIG. 1, there is shown a telescopic leg assembly 10 embodying the present invention which is coupled between a support such as a floor 12 at its base and to a movable member, such as the undersurface of tabletop 14, using conventional fasteners (not shown). The telescopic leg assembly 10 includes, in the preferred embodiment, three generally cylindrical tubes with an outer or base leg 16, an intermediate leg 18, and an inner leg 20, each of which are generally cylindrical in cross section and have their inner surfaces typically coated with a lubricious polymeric material to allow the telescopic sliding of the legs 20 and 18 within each other and within the outer leg 16. Leg 16 has a 70 mm outer diameter (OD) and a 66 mm inner diameter (ID). Leg 18 has a 65 mm OD and a 61 mm ID. Leg 20 has a 60 mm OD and a 56 mm ID. The leg assembly 10 can be extended from a fully collapsed or retracted position shown in FIG. 2, which in one embodiment was approximately 54 cm, to a fully extended position as shown in FIG. 1, which in the preferred embodiment was approximately 114 cm, and is driven by an electric motor 30 mounted coaxially within the inner leg 20 by the novel mounting and drive system of the present invention which allows the motor 30 to be accommodated within the cylindrical volume of the inner leg 20 for all ranges of motion between the limits seen in FIGS. 1 and 2. Thus, a relatively powerful electric drive motor 30 can be employed and accommodated by mounting at one end of the drive mechanism within the relatively confined space of the inner leg 20 and yet provide sufficient torque to drive the leg at a speed of, for example, 38 mm per second in one embodiment, raising a load of 60 k for each leg assembly 10 embodied in a table assembly. Typically, a table assembly will include at least two pedestal legs and, in some embodiments, three or four. The unique mounting assembly and drive mechanism for the motor positioned at one end within the inner leg of the telescopic leg assembly is now described in greater detail.

The basic elements of the drive system, including the motor 30, comprises a pedestal mount which physically couples the motor in fixed spaced relationship to a second drive collar 50 (FIGS. 1, 2, and 4) by means of three equally spaced mounting rods 22, 24, and 26, which are mounted to the motor 30 at approximately 120° intervals as described below and which extend through generally circular clearance apertures 32, 34, and 36, respectively, (FIG. 4) in a first drive collar 40 such that drive collar 40 moves with relationship to the mounting rods 22, 24, 26. Motor 30 is coupled to a mounting plate 38 by means of fastening screws 39 (FIG. 3). The solid rod pedestals 22, 24, and 26 are mounted within recessed blind apertures 31 in mounting plate 38 which are spaced at approximately 120° intervals and which receive one end 21 of each of the rods, which include a threaded aperture for receiving attaching screws, such as cap screws 33, mounting the rod ends 21 to mounting plate 38, which subsequently is mounted to the motor 30. The opposite ends 23 of mounting rods 22, 24, and 26 are fixedly secured within cylindrical apertures 51 of drive collar 50 by means of fastening screws 95 (FIGS. 4 and 7), which also attach mounting plate 94 to the undersurface of drive collar 50. For such purpose, the ends 23 of mounting rods 22, 24, and 26 include threaded apertures for receiving fasteners 95.

Motor 30 includes a drive shaft 35 which is coupled to a drive screw 60 (FIGS. 1, 2, and 4) having an externally threaded surface which inter-engages a drive nut 42 in the first drive collar 40. Drive nut 42 is internally threaded, as shown schematically at 41 in FIG. 5 and is fixedly seated within an aperture 44 in drive collar 40 and held therein by a spring retainer ring 45. The drive nut 42 is thus fixed within drive collar 40. As drive screw 60 rotates with respect to drive collar 40, the drive collar moves toward and away from the motor 30 as seen in FIGS. 1 and 2.

Drive collar 40 includes a generally annular shoulder 46 on which the end of the inner leg 20 rests. As the drive collar moves in a direction to extend the leg 20, leg 20 will be lifted by the shoulder 46. Flush mounted set screws also extend at 120° intervals between leg 20 and the cylindrical outer wall of drive collar 40 into threaded apertures 47 for providing a positive coupling of the drive collar 40 to the inner telescopic leg 20. Drive collar 40 also includes an axially extending cylindrical clearance aperture 48 for allowing a second fixed drive screw 70, which is mounted to a base plate 72 by means of a fastening screw 74 (FIG. 7) to extend through and into drive collar 40 when in a fully collapsed position, as seen in FIGS. 2, 4, and 7.

The end 61 of drive screw 60 is coupled to motor drive shaft 35 by means of a coupling collar 64 (FIG. 4). A roll pin 63 extends into the drive screw end 61, and a set screw 65, which threadably extends through collar 64, engages a flat on drive shaft 35. The opposite end 68 of drive screw 60 is coupled to a thrust bearing 80 (FIG. 6) seated within a cylindrical aperture 52 in lower drive collar 50 to position a drive gear 66 fixedly mounted to the drive screw 60 in spaced relationship to end 68 of drive screw 60 to position the drive gear in meshing relationship with a ring gear 82 fixedly coupled to a power nut 84 within the second drive collar 50, which is internally threaded to engage fixed drive screw 70. Nut 84 is, therefore, driven by the powered drive screw 60 and is captively held within the second drive collar 50 to raise and lower the second drive collar from base 72, as seen in FIGS. 1 and 2, as power nut 84 is driven through meshed gears 66 and 82. The power nut 84 is captively held within aperture 54 of drive collar 50 by means of a thrust washer 56 and thrust bearing 58 held within the second drive collar 50 by means of a mounting plate 90 (FIG. 4) (which is secured within threaded apertures of the upper surface of drive collar 50 by suitable fasteners, such as screws 95).

Thus, power nut 84 is sandwiched between plate 90 and bushing 54 by having plate 94 hold bushing 54 by screws 95 and rods 22. Screws 92 secure leg 18 to collar 50.

Drive collar 50, like drive collar 40, engages the intermediate leg 18 and also may be fixed thereto by flush mounted set screws 92 extending within holes of the cylindrical sidewall of leg 18 into threaded apertures in drive collar 50 to provide a positive locking engagement with the intermediate leg 18. A bottom plate 94 (FIG. 4) captively holds the opposite end of power nut 84 and an associated bushing 54 within the second drive collar 50. Plate 94 is mounted to the threaded apertures 23 in rods 22, 24, 26 and to drive collar 50 by means of threaded fasteners 95. Plate 94 has a diameter that is slightly greater than that of drive collar 50 and the bottom annular surface of leg 18 rests on the annular extension, as best seen in FIG. 7.

The ring gear 82 is lockably fitted to an annular shoulder 85 on power nut 84 by means of a pair of roll pins 86 extending axially within the shoulder 85 and within suitable apertures formed in the ring gear 82 and power nut such that force is transferred from drive gear 66, also lockably mounted to drive screw 60 with a roll pin, to the power nut 84, which is rotatably mounted within the drive collar 50 by means of thrust washer 56, thrust bearing 58, and a bushing 54 on the opposite side of shoulder 85. Drive screw 60 is secured within aperture 52 of drive collar 50 utilizing the thrust bearing 80 with the end 68 of the drive screw 60 being supported by a bushing 53, as seen in FIGS. 4, 6, and 7. A snap ring 55 (FIGS. 4 and 5) fits within an annular groove in the end 68 to captively hold end 68 within the second drive collar 50.

Drive screw 60 rotates with respect to both drive collars 40 and 50 and causes drive collar 40 to raise and lower within the intermediate leg 18, raising and lowering inner leg 20. Gear 66 near the end of drive screw 60 meshes with the ring gear 82 on power nut 84 to cause the second drive collar 50 to raise and lower on the fixed drive screw 70 which, in turn, raises and lowers the intermediate leg 18 and the motor 30 through the mounting pedestal, including rods 22, 24, and 26, secured to the second drive collar 50.

Thus, as the drive screw 60 is rotated by motor 30, which, in a preferred embodiment, was a commercially available Pittman Model GM9236E347 motor, drive collar 40 raises and lowers and, in turn, drives power nut 84 captively held within drive collar 50 to also raise and lower on fixed drive screw 70 mounted to the base plate 72, in turn, resting on a support, such as floor 12. The rotation of drive screw 60, therefore, causes both drive collars to move axially within the telescopic intermediate leg 18 and outer leg 16 and their coupling to legs 18 and 20, causing the legs to telescopically extend and retract. By providing the motor 30 at one end of the assembly and generally axially aligned with the innermost leg 20, the motor size can be sufficient to substantially occupy the cylindrical volume of leg 20 and thereby be of sufficient size to provide a torque and drive speed necessary for the convenient movement of an adjustable work surface to which the telescopic leg assembly 10 is mounted. Electrical power is supplied to motor 30 through a coiled conductor (not shown) which straightens when the assembly 10 is in an extended position, as seen in FIG. 1, and coils when in a position as seen in FIG. 2. Although the invention finds application to the mounting of a table surface for adjustment, it could likewise be employed in any environment in which it is desired to move one member with respect to another utilizing a streamlined telescopic tube assembly with an internally mounted motor drive.

The outer diameter of the cylindrical drive collars is selected to allow them to move easily within the inner diameters of the inner leg 20 and the intermediate leg 18, respectively. Although in the preferred embodiment of the invention the legs are shown as being cylindrical, any tubular leg, such as square or rectangular, can be employed and the drive collar shapes selected to accommodate such different configured legs. These and other modifications to the preferred embodiment will become apparent to those skilled in the art and such modifications to the preferred embodiment of the invention as described herein can be made without departing from the spirit or scope of the invention as defined by the appended claims.

The invention claimed is:

1. A telescopic multiple leg assembly comprising:
   outer, intermediate and inner telescopically coupled legs;
   a fixed drive screw extending from one end of said outer leg;
   a drive collar including a rotatable power nut mounted therein and coupled to said fixed drive screw such that rotation of the power nut moves said drive collar with respect to said outer leg and with respect to said fixed drive screw, said drive collar coupled to said intermediate leg for moving said intermediate leg with movement of said drive collar;
   a drive motor coupled to said drive collar by a plurality of elongated rods spacing said drive motor axially from said drive collar;
   a rotatable drive screw coupled to said drive motor for rotation of said rotatable drive screw, said rotatable drive screw having an end including a drive gear coupled to said power nut for rotating said power nut within said drive collar to extend and retract said intermediate leg with respect to said outer leg; and
   an additional drive collar mounted to an end of said inner leg and including an additional threaded drive nut engaging said rotatable drive screw to extend and retract said inner leg with respect to said intermediate leg such that as said rotatable drive screw is rotated, said inner leg moves with respect to said intermediate leg and said intermediate leg moves with respect to said outer leg.

2. The assembly as defined in claim 1 wherein said motor has a drive shaft and said rotatable drive screw is coupled directly to said drive shaft.

3. The assembly as defined in claim 1 wherein said legs are tubes.

4. The assembly as defined in claim 3 wherein said motor is positioned within said inner leg.

5. The assembly as defined in claim 4 wherein said drive collar and said additional drive collar are movably positioned within said outer and within said intermediate legs, respectively.

6. The assembly as defined in claim 5 wherein said legs are cylindrical.

7. The assembly as defined in claim 6 wherein said power nut in said drive collar includes a ring gear which meshes with said drive gear on said rotatable drive screw.

8. A telescopic multiple leg assembly comprising:
   outer, intermediate and inner telescopically coupled tubular legs;
   a fixed drive screw extending from one end of said outer leg within said leg;
   a drive collar including a rotatable power nut mounted therein and coupled to said fixed drive screw such that rotation of the power nut moves said drive collar within said outer leg and with respect to said fixed drive screw, said drive collar coupled to said intermediate leg for moving said intermediate leg with movement of said drive collar;
   a drive motor positioned within said inner leg and coupled to said drive collar by a plurality of elongated rods spacing said drive motor axially from said drive collar;
   a rotatable drive screw coupled to said drive motor for rotation of said rotatable drive screw, said rotatable drive screw having an end including a drive gear coupled to said power nut for rotating said power nut within said drive collar to extend and retract said intermediate leg with respect to said outer leg; and
   an additional drive collar mounted to an end of said inner leg within said intermediate leg and including an additional threaded drive nut engaging said rotatable drive screw to extend and retract said inner leg with respect to said intermediate leg such that as said rotatable drive screw is rotated, said inner leg moves with respect to said intermediate leg and said intermediate leg moves with respect to said outer leg.

9. The assembly as defined in claim 8 wherein said motor has a drive shaft and said rotatable drive screw is coupled directly to said drive shaft.

10. The assembly as defined in claim 8 wherein said rotatable power nut includes a ring gear engaging said drive gear on said rotatable drive screw.

11. The assembly as defined in claim 10 wherein three elongated rods couple said drive motor to said drive collar.

12. The assembly as defined in claim 11 wherein said additional drive collar includes apertures through which said rods extend such that said additional drive collar moves axially along said rods as said rotatable drive screw rotates.

13. The assembly as defined in claim 12 wherein said rods are spaced at approximately 120° intervals.

14. The assembly as defined in claim 13 wherein said legs are generally cylindrical.

15. The assembly as defined in claim 14 wherein said additional drive collar includes an annular shoulder engaging an annular end of said inner leg.

16. A compact telescopic multiple leg assembly for a table comprising:
   outer, intermediate and inner telescopically coupled legs, wherein one end of said outer leg rests on a support surface and the end of said inner leg remote from said one end is adapted to be coupled to the underside of a table surface;
   a fixed drive screw extending from one end of said outer leg within said leg;
   a drive collar including a rotatable power nut mounted therein and coupled to said fixed drive screw such that rotation of the power nut moves said drive collar within said outer leg and with respect to said fixed drive screw, said drive collar coupled to said intermediate leg for moving said intermediate leg with movement of said drive collar;
   a drive motor positioned within said inner leg and coupled to said drive collar by a plurality of elongated rods spacing said drive motor axially from said drive collar;
   a rotatable drive screw coupled to said drive motor for rotation of said rotatable drive screw, said rotatable drive screw having an end including a drive gear coupled to said power nut for rotating said power nut within said drive collar to extend and retract said intermediate leg with respect to said outer leg; and
   an additional drive collar mounted to an end of said inner leg within said intermediate leg and including an additional threaded drive nut engaging said rotatable drive screw to extend and retract said inner leg with respect to said intermediate leg such that as said rotatable drive screw is rotated, said inner leg moves with respect to said intermediate leg and said intermediate leg moves with respect to said outer leg.

17. A drive system for a multiple leg assembly comprising:

outer, intermediate and inner telescopically coupled legs;

a drive collar movably positioned within said outer leg and coupled to said intermediate leg, said drive collar including a power nut rotatably mounted therein;

a drive motor positioned within said inner leg and coupled to said drive collar by a plurality of elongated rods axially spacing said drive motor from said drive collar;

a fixed drive screw extending from one end of said outer leg and within said leg, said power nut engaging said fixed drive screw;

a rotatable drive screw coupled to said drive motor for rotation of said rotatable drive screw, said rotatable drive screw having an end including a drive gear coupled to said power nut for rotating said power nut within said drive collar to extend and retract said intermediate leg with respect to said outer leg; and an additional drive collar mounted to an end of said inner leg within said intermediate leg and including an additional threaded drive nut engaging said rotatable drive screw to extend and retract said inner leg with respect to said intermediate leg such that as said rotatable drive screw is rotated, said inner leg moves with respect to said intermediate leg and said intermediate leg moves with respect to said outer leg.

18. The assembly as defined in claim 17 wherein said legs are tubes.

19. The assembly as defined in claim 18 wherein said rotatable power nut includes a ring gear engaging said drive gear on said rotatable drive screw.

20. The assembly as defined in claim 19 wherein three elongated rods couple said drive motor to said drive collar.

21. The assembly as defined in claim 20 wherein said additional drive collar includes apertures through which said rods extend such that said additional drive collar moves axially along said rods as said rotatable drive screw rotates.

22. The assembly as defined in claim 21 wherein said rods are spaced at approximately 120° intervals.

23. The assembly as defined in claim 22 wherein said legs are generally cylindrical.

24. The assembly as defined in claim 23 wherein said additional drive collar includes an annular shoulder engaging an annular end of said inner leg.

25. The assembly as defined in claim 17 wherein said motor has a drive shaft and said rotatable drive screw is coupled directly to said drive shaft.

26. A drive assembly for use with a telescopic leg section comprising:

a stationary drive screw;

a drive collar including a rotatable power nut mounted therein and coupled to said stationary drive screw such that rotation of the power nut moves said drive collar with respect to said stationary drive screw;

a drive motor coupled to said drive collar by a plurality of elongated rods spacing said drive motor axially from said drive collar;

a rotatable drive screw coupled to said drive motor for rotation of said rotatable drive screw, said rotatable drive screw having an end including a drive gear coupled to said power nut for rotating said power nut within said drive collar to extend and retract said drive collar; and an additional drive collar including an additional threaded drive nut engaging said rotatable drive screw to extend and retract said additional drive collar as said rotatable drive screw is rotated.

27. The assembly as defined in claim 26 wherein said motor has a drive shaft and said rotatable drive screw is coupled directly to said drive shaft.

28. The assembly as defined in claim 27 wherein said rotatable power nut includes a ring gear engaging said drive gear on said rotatable drive screw.

29. The assembly as defined in claim 28 wherein three elongated rods couple said drive motor to said drive collar.

30. The assembly as defined in claim 29 wherein said additional drive collar includes apertures through which said rods extend such that said additional drive collar moves axially along said rods as said rotatable drive screw rotates.

31. The assembly as defined in claim 30 wherein said rods are spaced at approximately 120° intervals.

* * * * *